US007660748B2

(12) United States Patent
Archer et al.

(10) Patent No.: US 7,660,748 B2
(45) Date of Patent: Feb. 9, 2010

(54) WEBSITE USER ACCOUNT LINKING

(75) Inventors: Jaime Archer, Palatine, IL (US); David Tzau, Vernon Hills, IL (US)

(73) Assignee: CDW Corporation, Vernon Hills, IL (US)

( * ) Notice: Subject to any disclaimer, the term of this patent is extended or adjusted under 35 U.S.C. 154(b) by 268 days.

(21) Appl. No.: 11/453,527

(22) Filed: Jun. 15, 2006

(65) Prior Publication Data

US 2007/0011057 A1 Jan. 11, 2007

Related U.S. Application Data

(60) Provisional application No. 60/697,131, filed on Jul. 7, 2005.

(51) Int. Cl.
*G06Q 30/00* (2006.01)
(52) U.S. Cl. .......................................... 705/26; 705/27
(58) Field of Classification Search .................... 705/26, 705/27
See application file for complete search history.

(56) References Cited

U.S. PATENT DOCUMENTS

| 5,621,201 | A | * | 4/1997 | Langhans et al. ............ 235/380 |
| 5,970,475 | A | * | 10/1999 | Barnes et al. .................. 705/27 |
| 7,050,996 | B1 | * | 5/2006 | Blagg et al. .................... 705/30 |
| 2002/0049806 | A1 | * | 4/2002 | Gatz et al. .................... 709/203 |
| 2002/0099659 | A1 | | 7/2002 | Swentor ....................... 705/44 |
| 2003/0018567 | A1 | | 1/2003 | Flitcroft et al. ............... 705/37 |
| 2004/0168066 | A1 | | 8/2004 | Alden .......................... 713/182 |
| 2005/0010483 | A1 | | 1/2005 | Ling ............................ 705/26 |
| 2005/0102154 | A1 | | 5/2005 | Dodd et al. ..................... 705/1 |

OTHER PUBLICATIONS

Marlin, Steven; "Card Processor Brings CRM to Account Management," Bank Systems + Technology; May 2000; v37n5p58; Dialog file 16 #07346701, 3pgs.*
PCT "International Search Report and Written Opinion", dated Feb. 8, 2007, for counterpart International Patent Application No. PCT/US06/23352.

* cited by examiner

*Primary Examiner*—Robert M. Pond
(74) *Attorney, Agent, or Firm*—Marshall, Gerstein & Borun LLP

(57) ABSTRACT

In one aspect the invention is of a method for linking separate accounts of related organizations on a commercial website which comprises establishing a tree structure defining the relationship of the various accounts in the tree, obtaining approval of the tree structure by authorized personnel responsible for the accounts, and linking the separate accounts in accordance with the relationship defined by the approved tree structure. The step of establishing a tree structure may be performed on-line. In another aspect the invention includes selecting various accounts to be linked while connected to the website, selecting at least one data parameter from a plurality of data parameters to be included in aggregated form from the selected accounts, and aggregating data for the selected data parameters from the selected accounts. In still another aspect the invention includes establishing a plurality of rules regarding the authority for users of various linked accounts to purchase goods or services from a commercial website, and assigning at least one group of users to whom the rules apply, wherein the step of establishing said plurality of rules is performed by a person representing an account at a higher level in the tree structure than the level of at least one of the accounts of the users to whom the rules apply.

24 Claims, 9 Drawing Sheets

*FIG. 10*

| View Orders | Reports | Workflow |

Order Details:

Order Number      Order Date
    1234            06/04/04

Billed From    Billing        Shipping       Shipping    Payment
Address        Address        Address        Method      Method
               XYZ Inc.       XYZ Inc.                   Credit
               2 Lane St.     2 Lane St.                 Card
               Chicago, Ill.  Chicago, Ill.

[Edit] ~158    [Edit]        [Edit]       [Edit]

160

| Date | Name | Status | Rule | Comments |
|------|------|--------|------|----------|
| 06/04/04 | J. Jackson | Purchased | 1 | |
| 06/10/04 | T. Gray | Approved | 1 | |
| 06/15/04 | W. Smith | Pending Approval | 1 | |

162

Quantity    Product Description    Price
[Remove Item]          2         Wireless Port        $200.00

[Remove Item]          2         ABC Computer         $600.00
    164
                                    Subtotal          $800.00
                                    Tax                $10.00
                                    Total             $810.00

166—[Approve Order]    [Deny Order]—168

WEBSITE USER ACCOUNT LINKING

RELATED APPLICATIONS

This application is related to and claims the priority of U.S. Provisional Application No. 60/697,131 filed Jul. 7, 2005, the contents of which are herein incorporated by reference.

BACKGROUND OF THE INVENTION

The present invention relates to a method to facilitate monitoring the use of a website posted on the Internet by an organization having multiple users accessing the website, and particularly to a method for linking a plurality of website user accounts directly or indirectly related to said organization to facilitate monitoring by authorized personnel of the organization.

Typically, a business enterprise, governmental entity or other organization may have multiple personnel who access the commercial website of a supplier or other entity for the acquisition of goods and/or services. These personnel access the website on behalf of their own organization which, for example, might be a division or subsidiary of a parent company or organization. As a result, the commercial website will have separate accounts for each of the divisions or subsidiaries of the parent. In some cases, the supplier may well have a number of commercial websites offering their goods and services. For example, the supplier may have separate websites in different countries. Because of the number of separate accounts that may be involved it is difficult for an organization to monitor all of the activities of the personnel of its various related organizations in accessing its suppliers' websites.

It is known to provide access on a commercial website to various accounts of an organization that have the same billing address. Presently, however, the data for each account is made available only on an individual basis. In other words the data for the various accounts is not made available in aggregate form. There is therefore a need for a method of aggregating the data of various accounts of related organizations to make such data available for monitoring by authorized personnel of those organizations.

SUMMARY OF THE INVENTION

In one embodiment, the invention is of a method for linking separate accounts of a commercial website on the Internet which comprises establishing a tree structure defining the relationship of the various accounts in the tree, obtaining approval of the tree structure by authorized personnel responsible for the accounts, and linking the separate accounts in accordance with the relationship defined by the approved tree structure. In a preferred form the step of establishing a tree structure is performed on-line.

In another embodiment, the invention includes a method for linking separate accounts on a commercial website on the Internet which comprises selecting various accounts to be linked while connected to said website, selecting data parameters from a plurality of data parameters to be included in aggregated form from the selected accounts, and aggregating data for the selected data parameters from the selected accounts. In a preferred form the method includes providing at least one screen for simultaneous viewing of the aggregated data for the selected accounts by a user of the website who is authorized to access the aggregated data.

In a further embodiment, the invention includes a method for controlling the purchase of goods or services from a commercial website on the Internet by users from a plurality of separate accounts within an organization. The method comprises establishing a tree structure defining the relationship of the various accounts within the organization, linking the separate accounts in accordance with the relationship defined by the tree structure, and establishing a plurality of rules regarding the authority for users to purchase goods or services from said commercial website, and assigning at least one group of users to whom the rules apply. In a preferred form, at least one of the rules may preclude a user from checking out and completing the purchase if the proposed purchase exceeds, for example, a certain total dollar amount. In another preferred form, at least one of the rules may require approval by at least one additional person selected to approve or deny purchases that exceed the restriction of that rule. In still another preferred form, a plurality of rules are arranged in ascending order so that a person selected for review of a purchase represents an account at one of the levels in the tree structure and a second person selected for review of said purchase represents an account at a higher level in the tree structure than the first mentioned level therein.

BRIEF DESCRIPTION OF THE DRAWINGS

FIG. 10 is a sample computer screen showing the functions of viewing, approving, denying and editing of orders by an authorized reviewer.

DETAILED DESCRIPTION OF THE PREFERRED EMBODIMENTS

Figure 1:
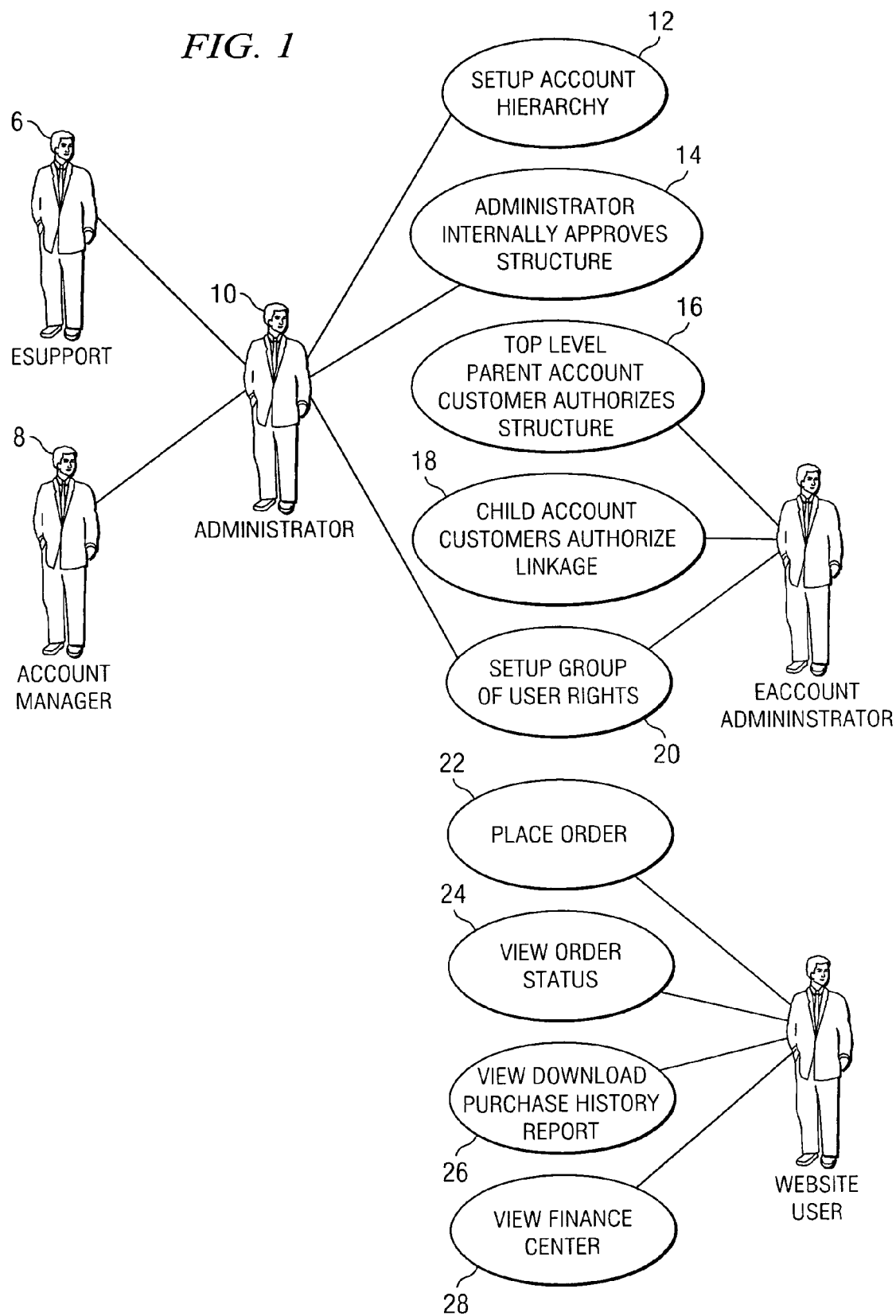
FIG. 1 is a schematic illustration of a method of establishing linking of website accounts of related organizations.

FIG. 1 illustrates a sample procedure for linking the accounts of related organizations that have personnel accessing a commercial website. The commercial website may be maintained by a supplier of goods and/or services to customers that include business enterprises, government entities or other organizations. Its customers may include a parent company having many subsidiary companies, with each of those subsidiary companies having various subsidiaries of their own. Each subsidiary typically will have a separate account established with the commercial website. In addition, each parent and subsidiary may choose to have separate accounts for its headquarters and each of its divisions or plants. Accordingly, there may be a number of separate accounts for the various organizations that are directly or indirectly related to a parent organization. Referring to FIG. 1, E-support personnel 6 or account managers 8 of the commercial website report to website administrator 10. In response to a request from a customer, E-support personnel 6 or account managers 8 propose a hierarchy or tree structure 12 and obtain internal approval of the tree structure by website administrator 10. The steps taken to initially set up the tree structure will be described in greater detail below. After internal approval 14 of the proposed tree structure, approval of the responsible authorities 16 of the parent customer organization and each of the related customer organizations 18 is obtained for the proposed linking of the accounts of those organizations. When all necessary approvals of the customer organizations are obtained then website administrator 10 and an authorized customer administrator set up group or user rights 20 identifying personnel authorized to access various databases of the linked accounts, for example, place order 22, order status 24, purchase history 26, and payments or finance 28.

Figure 2:
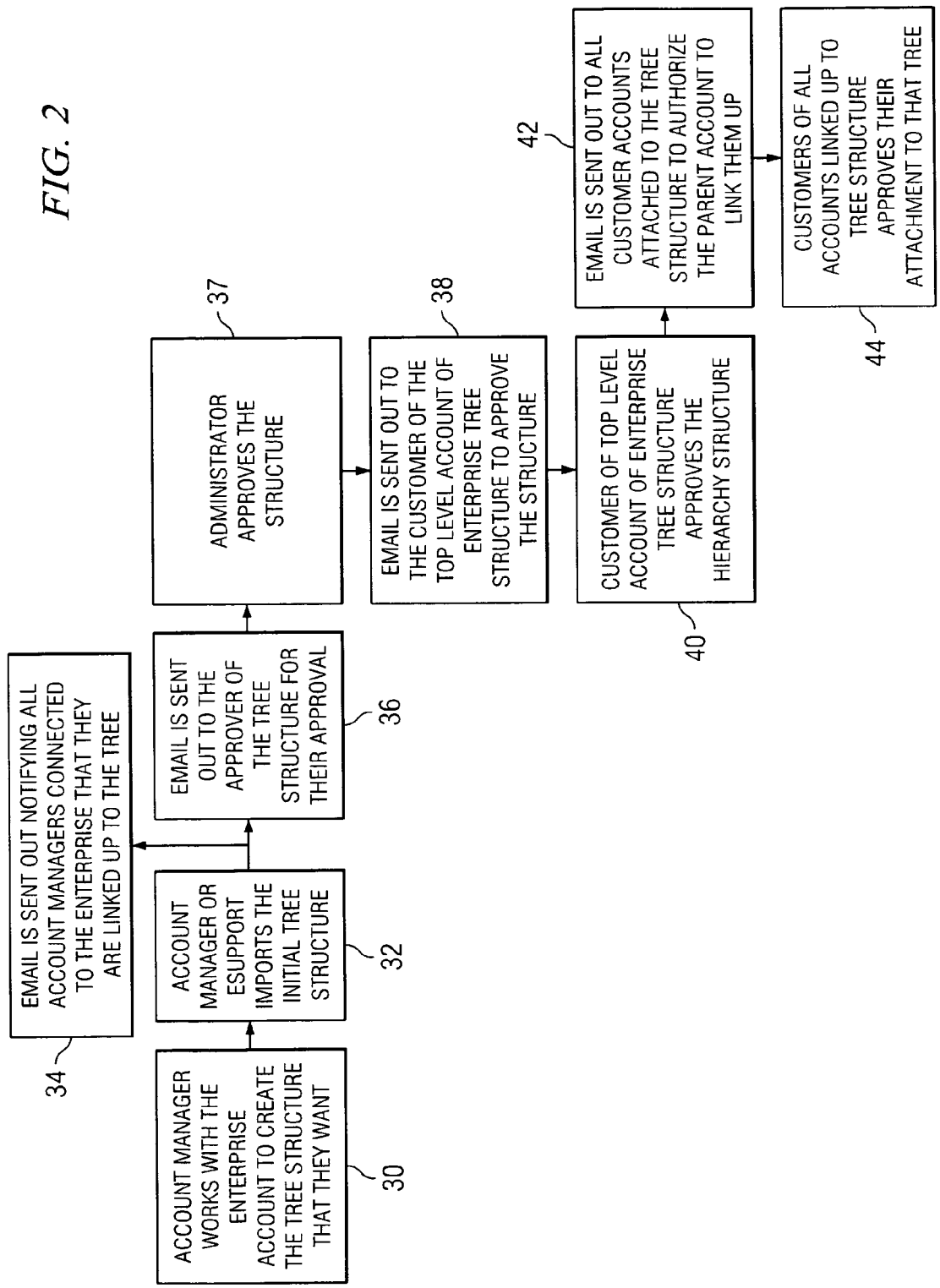
FIG. 2 is a block diagram of an approval process for establishing a website hierarchy or tree structure of linked accounts.
Figure 5:
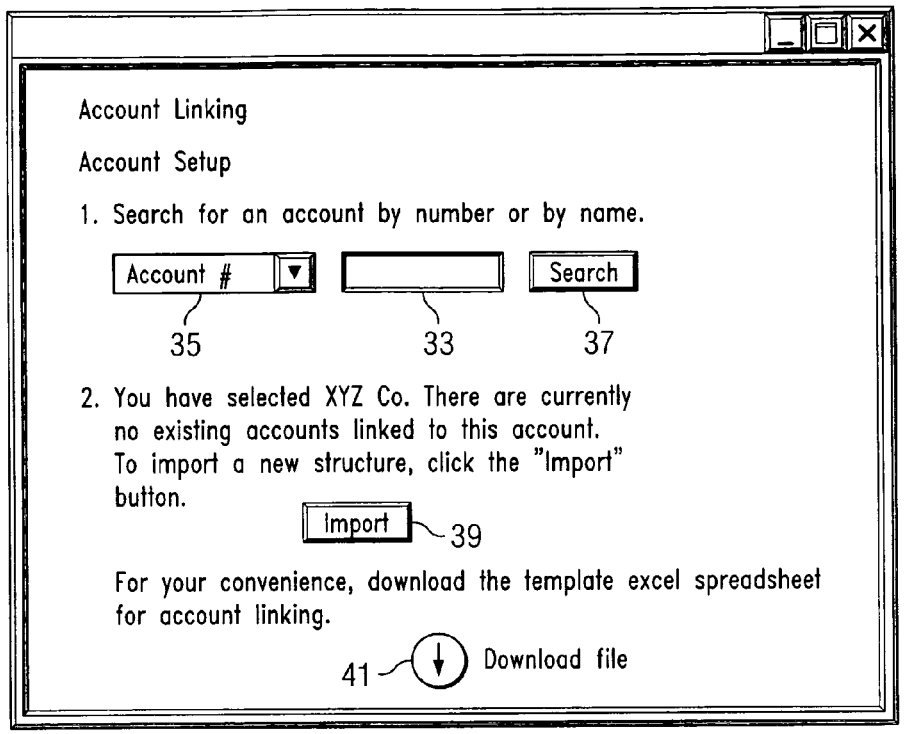
FIG. 5 is a sample computer screen showing options for linking various accounts of an organization.
Figure 6:
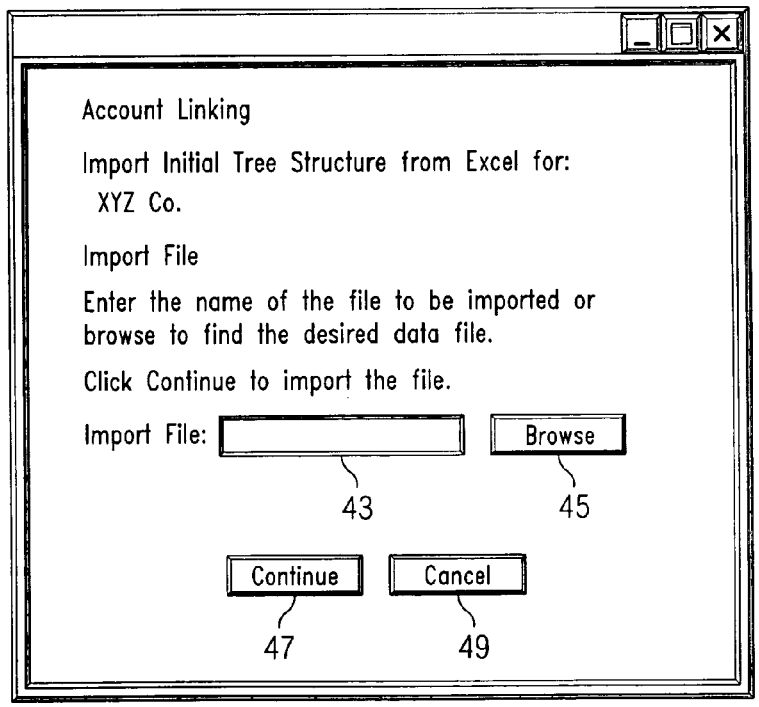
FIG. 6 is a sample computer screen for importing accounts to be linked in the database.

FIG. 2 provides additional details of the account linking approval process. One or more website account managers work with representative of the customer organization to create the tree structure 30 that the customer wants to have of its various accounts. The account manager or technical support personnel then imports 32 the initial tree structure into the website using appropriate computer screens designed for that purpose. A typical computer screen for establishing a tree structure is shown in FIG. 5. The screen has a search box 33 for entry of an account number or name and a drop down menu 35 to select account number or name. A search button 37 is provided for searching for the account number or name entered in the search box. If an account is selected which has a tree structure, then the tree structure will be displayed. If a tree structure does not exist for that account, then a message is displayed stating this and the ability to import the initial tree structure is provided by import button 39. The account managers are able to download an EXCEL spread sheet using a download button 41 and fill it out with their customers and then import them as linked accounts. The spread sheet contains field columns for each child account number and its corresponding parent account number. A sample computer screen for accomplishing import of the files to be linked in the database is shown in FIG. 6. A search box 43 is provided for entry of an account number or name. A browse button 45 is also provided and a new window pops up with options to browse for the various accounts in the database. A continue button 47 is provided to import the account selected on the pop up window and a cancel button 49 is provided to cancel the import. Referring again to FIG. 2, upon completion of the proposed initial tree structure, notice 34 is then sent to all of the website account managers indicating that their customer accounts are linked up to the tree. The notice may include indication of any discrepancies in the data or data format of a particular account with respect to other accounts in the tree so that appropriate steps can be taken to correct any such discrepancies. Communication 36 is then made with a responsible authority of the website seeking internal website approval of the tree structure. After such internal approval, a communication 38 is sent to the customer of the top level account for approval of the tree structure. After approval 40 by the top level customer account, communications 42 are sent to all of the customer accounts attached to the tree structure to seek their authorization to link them to the tree 44. Typically all of the communications can be conducted by e-mail to expedite the approval process. After completion of the initial tree structure maintenance is provided by a computer screen containing add account or delete account buttons.

Figure 3:
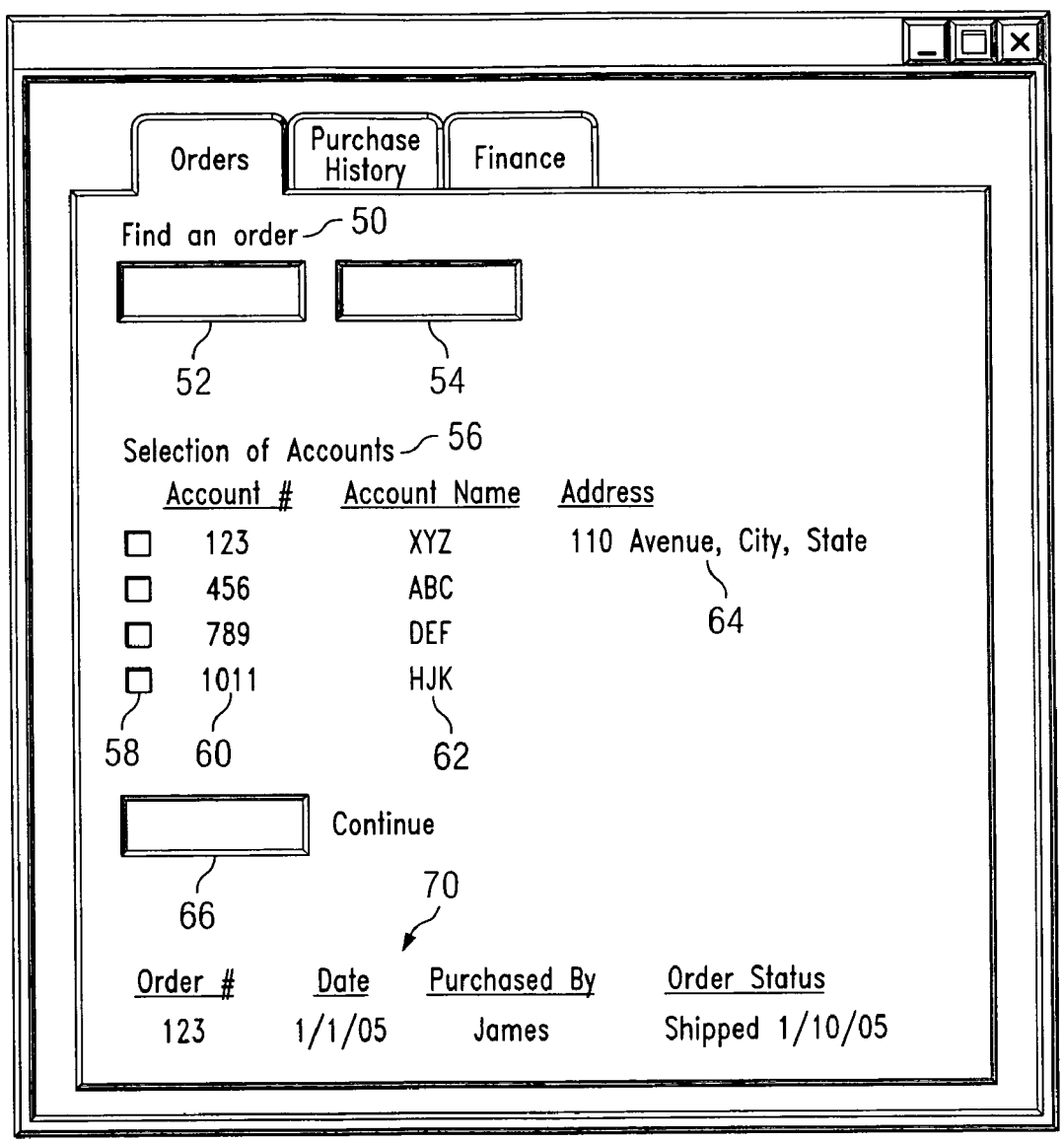
FIG. 3 is a sample illustration of a computer screen designed to enable an authorized user to select available accounts of related organizations to be linked for creating specific reports.

FIG. 3 is a sample illustration of a computer screen for enabling an authorized customer user to select available accounts of related organizations to be linked for creating specific reports of data concerning those organizations. For example, if the user wants to view the status of orders placed by personnel of its related organizations for goods or services on the website, the user will have the ability to select multiple accounts to view data concerning order status. FIG. 3 shows a sample computer screen for this purpose. The following fields are displayed on the order status page: For locating a particular order a find order heading 50 is displayed with a search text box 52 provided below the heading. Button 54 adjacent the search text box enables the user to search for the particular order described in the text box. According to this invention, a new heading 56 is provided to enable selection of accounts from the list below of related organizations. Check boxes 58 are provided for clicking on the selected accounts. Account numbers 60 and account names 62 are provided to the right of each check box, along with the account address 64. Below the list of accounts, a continue button 66 is provided for linking the data from the selected accounts. After clicking the continue button, a list 70 of orders showing the status of each of them is displayed. The list includes all orders for the selected accounts so that order status for all of those accounts may be viewed simultaneously in aggregate. Usually the orders will be grouped by account and then particular order status, for example, invoiced and shipped. Other arrangements of the aggregate data can be provided as desired.

Figure 4:
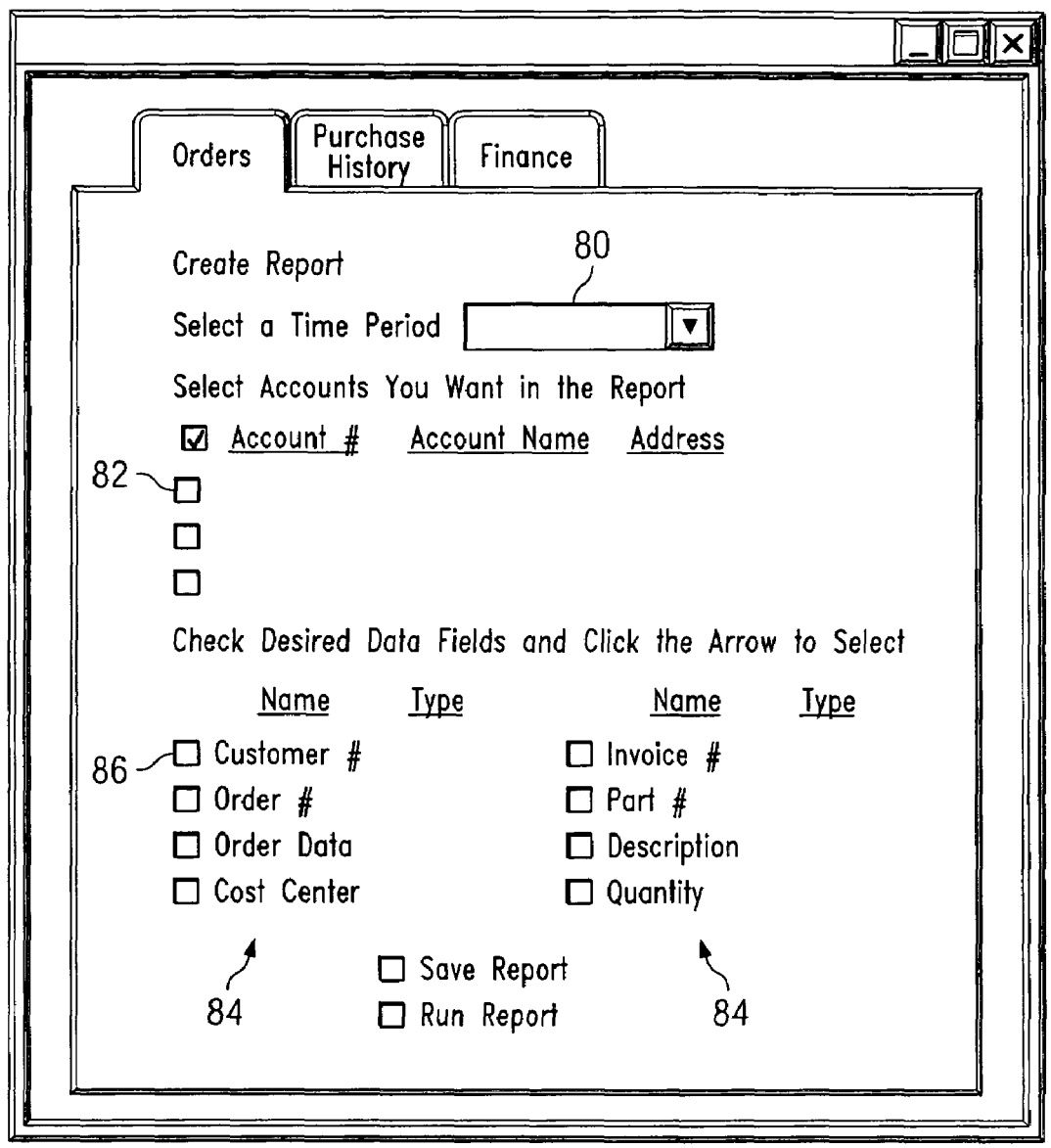
FIG. 4 is a sample computer screen showing aggregated data of selected related organizations and selected data parameters.

FIG. 4 is a sample computer screen for providing an authorized customer user the ability to select various accounts of related organizations for inclusion in a customized report to be created by the user. The screen includes a drop down menu 80 for selecting a time period for the report, with options to select, for example, previous day, month-to-date, last 6 full months, current year, and previous year or years. Below drop down menu 80, check boxes 82 are provided for the selection of accounts to be included in the report. Account number, account name and account address are provided to the right of each check box to identify the available accounts. Below the list of available accounts, a list of data fields 84 is provided. Each data field has a check box 86 which the user may click on to select the data fields to be included in the report. Such data fields may include, for example, customer number, order number, order date, cost center, invoice number, and part or item identifying number, description, quantity, and price. Once the accounts and data fields have been selected a save report button is provided and below that a run report button. When the run report button is clicked, a screen will be displayed of aggregated data of the various selected data fields for the selected accounts. Thus, a method is provided for creating customized reports for selected accounts of related organizations.

Figure 7:
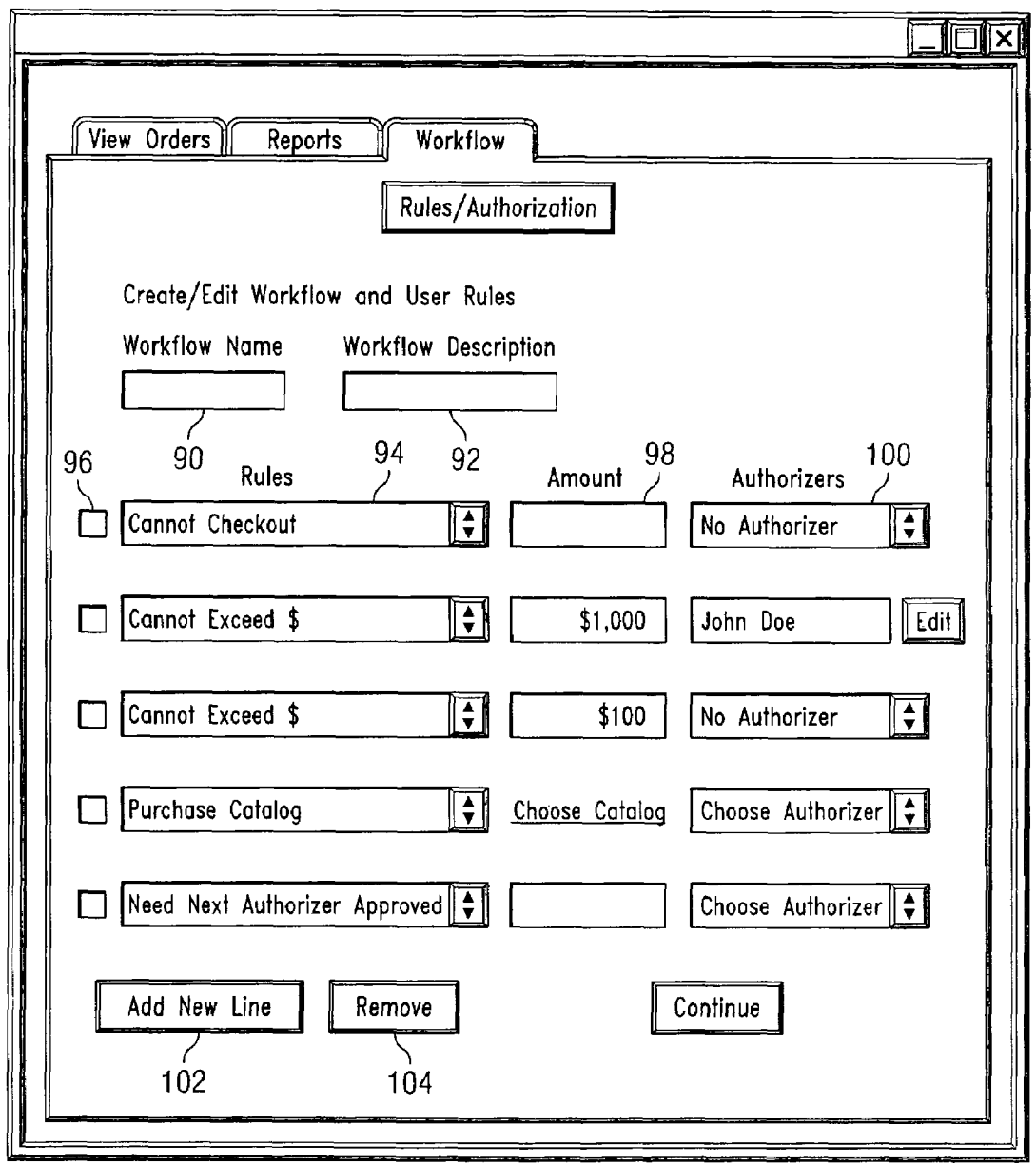
FIG. 7 is a sample computer screen for creating a combination of workflow rules by selecting a rule, entering the amount or criteria and choosing the authorizer for review and approval or denial of orders exceeding the restriction or requirement of the rule.

In addition to being able to create reports for monitoring the activity of selected accounts of related organizations, the customer may also be provided with the ability to regulate the purchase of goods or services by users of the various linked accounts from a central authority such as an administrator of the parent customer organization. When a tree structure has been approved and the various accounts have been linked, an administrator of the parent customer organization can create a workflow which consists of rules regulating the purchase of goods or services from the website by users from the various linked accounts. FIG. 7 shows a sample computer screen for creating a set of rules for a workflow. The rules may include, for example, a restriction on the total monetary amount that a user is authorized to purchase, a maximum unit price for an individual item, a list of items that the user is authorized to purchase, or a catalog from which the user may select items for purchase. For each rule an authorizer may be selected to allow the user to make a purchase when an order exceeds any of the rules. A rule without an authorizer may also be specified with the implication that an order that violates that rule cannot be approved. Rules involving total order amounts or individual line item prices are arranged in increasing order so that, for example, orders over $5,000 can only be setup to follow a rule that specifies a total order restriction with a smaller amount such as $2,000. In FIG. 7, boxes 90 and 92 are provided for typing in the name of a workflow and a description of the workflow, respectively. Dropdown menus 94 are provided for creating various types of rules that may be included in a workflow. A box 96 is provided to the left of each menu for entry of a number or letter identifying the ruled. To the right of each menu a space 98 is provided for typing an amount related to the rule. To the right of space 98 a dropdown menu 100 is provided for choosing an authorizer to review and approve or deny a purchase that exceeds the rule. The authorizers listed in the dropdown menu are selected from all available users on a separate computer screen described below. The first line in menu 94 shows a rule entitled "cannot checkout". No authorizer is selected indicating that the purchase which exceeds this rule cannot be completed. The second line in menu 94 shows a rule that the purchase cannot exceed a specific dollar amount, for example, $1,000, without approval by an authorizer. The fourth line in menu 94 indicates a rule that a purchase cannot be made outside of a catalog without approval by a person selected as an authorizer for that rule. The fifth line in menu 94 shows that approval of the next authorizer is required for a particular purchase, thus allowing the administrator to require authorization of a purchase by a person representing, for example, the parent organization. Buttons 102 and 104 are provided to add a new line or to remove a line for adding or deleting rules.

Figure 8:
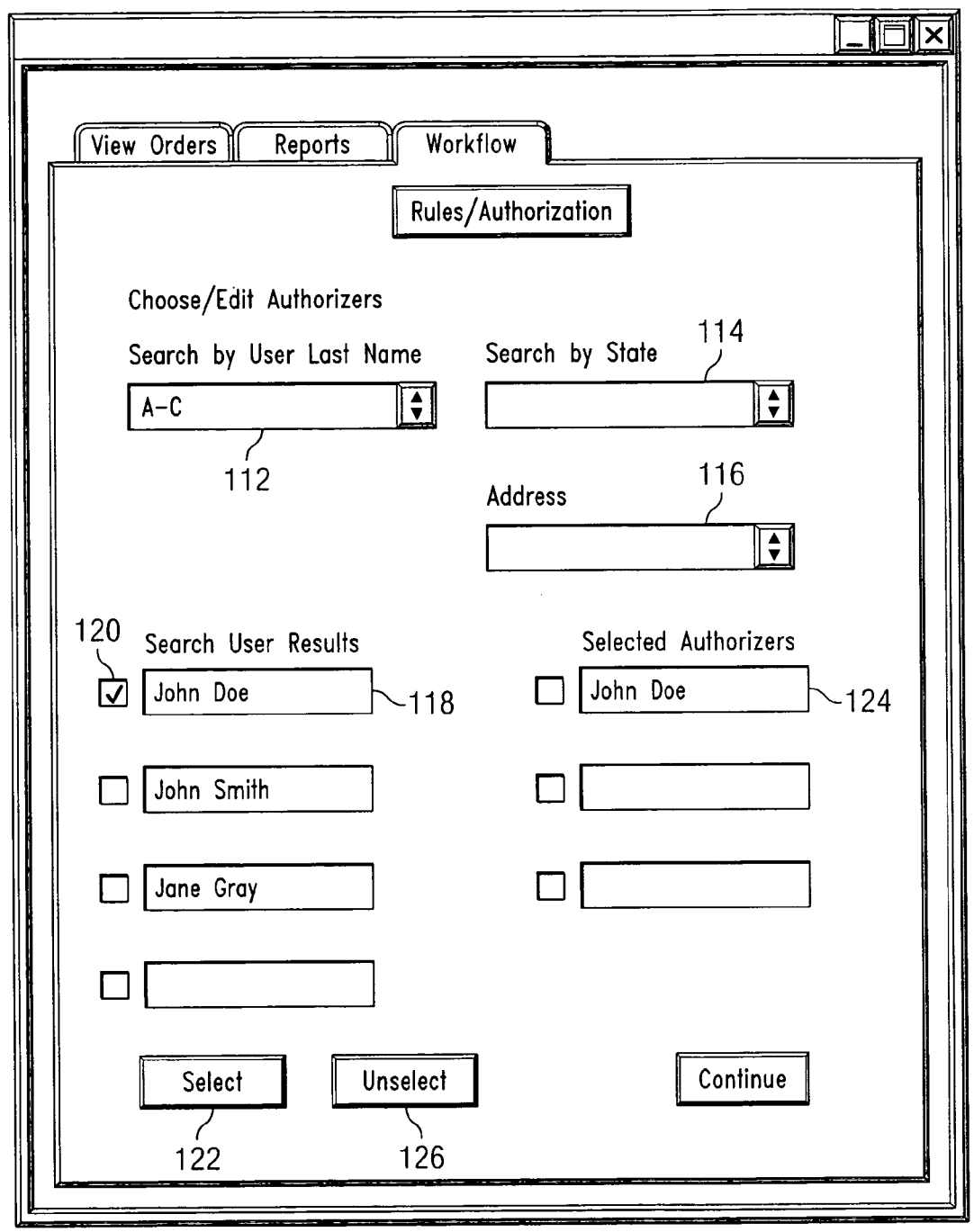
FIG. 8 is a sample computer screen for choosing authorizers from a list of available users in the organization.

FIG. 8 shows a sample computer screen for selecting authorizers from a list of all available users of the website. Search box 112 enables a search by user name. Search boxes 114 and 116 enable searches by state or address. Searches by other identifiers may also be included such as the organization which the user represents, the user's title, or other category. List 118 displays the names and addresses of users found using the search boxes described above. Spaces 120 are provided for identifying users who are to be selected as authorizers when button 122 labeled "Select" is pressed. The selected authorizers are listed in menu 124. Button 126 labeled "Unselect" enables the removal of an authorizer from the selected authorizer list.

Figure 9:
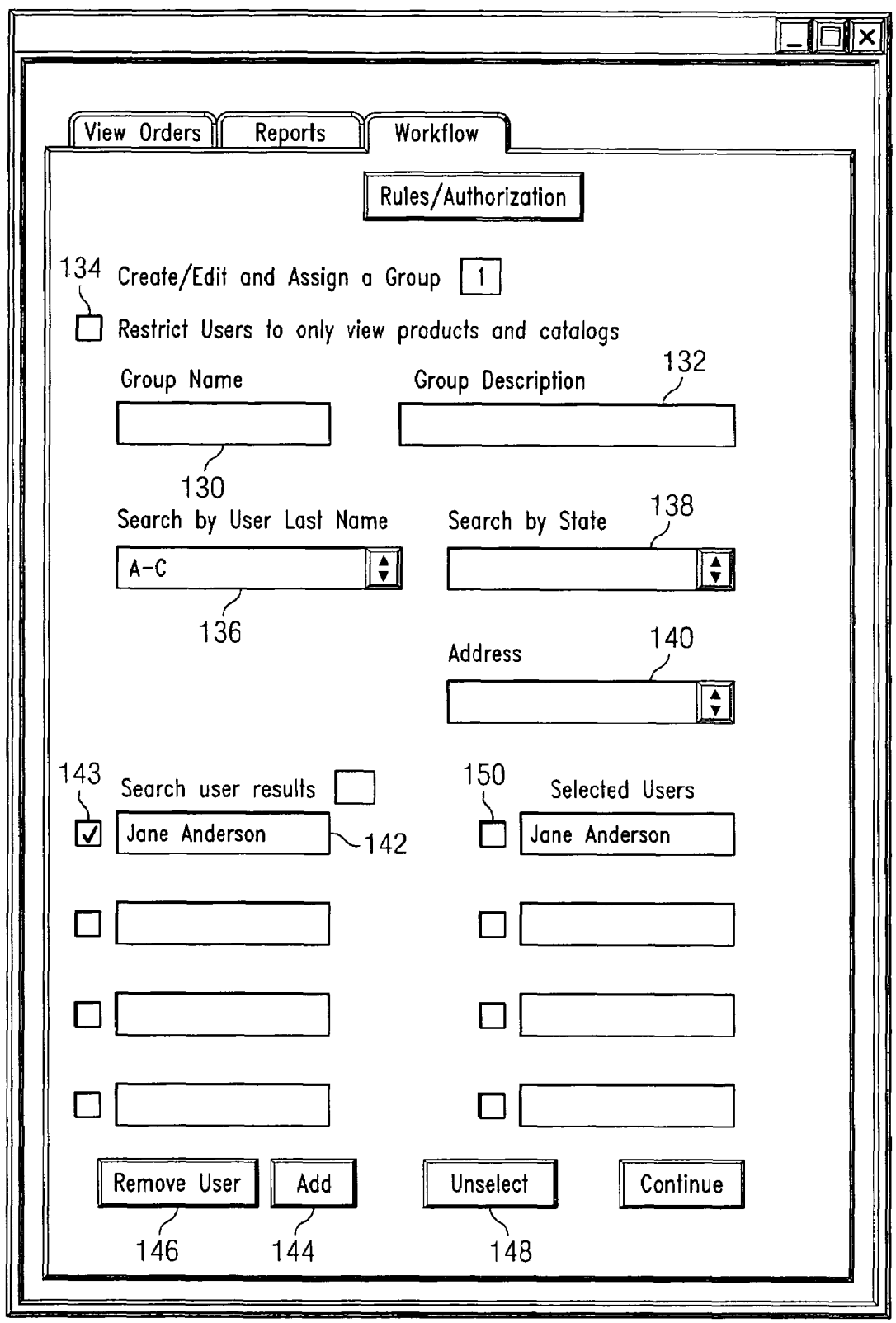
FIG. 9 is a sample computer screen for creating or editing a group and the users that are contained within the group.

Once a workflow has been created, it can be associated with any of various groups within an organization. A group can be selected or unselected by checking or un-checking a checkbox next to it in an available group list. FIG. 9 shows a sample computer screen for creating or editing a group and the users that are contained within the group. Box 130 is provided for entry of a name for the group. Box 132 provides a space for typing a description of the group. If the administrator wants to restrict the users in the group so that they can only view products and catalogs, box 134 is provided which may be checked for that purpose. Box 136 is provided for search for a user by the user's last name. Box 138 enables a search by location, for example, the state where users are located. Box 140 provides a search for users at a specific address. The search results are shown in the Search Results column 142. A checkbox 143 is provided next to each user's name for selecting that user for inclusion in the group. Add button 144 is provided for adding the checked users to the list of users in the group. Button 146 enables removal of a user from the search results list. The selected users are listed in the selected user list 144. Button 148 enables un-selection of users from the selected user list when a checkbox 150 is checked. Using this computer screen the customer administrator is able to create user groups or edit existing user groups.

In operation a user places an order when connected to the website. If approval is required the order is listed as "waiting for review" on a screen that is accessible to an authorizer. The authorizer is able to click on the order number to bring up a screen for review of the details of the order. FIG. 10 is a sample computer screen that an authorizer might view for review of the purchase order. The order number and date the order was placed are shown at the top of the screen. Below the order number the address from which the order was billed and the billing address are shown along with a shipping address, shipping method and payment method. Below each of these listings a button 158 is provided for edit of the information contained in the space above. The history of the order is shown in box 160 where the Date, Name, Status, and Rule that triggered the need for approval are provided along with any comments. Prior review and approval is indicated as shown on the second line and pending approval on the third line. The products ordered are listed on separate lines in box 162 below box 160. Buttons 164 enable the authorizer to remove any item listed on a particular line in box 162. Buttons 166 and 168 are provided at the bottom of the screen to approve or deny the order. If the order is denied a communication, for example, by e-mail is sent to the person who placed the order and any previous authorizers indicating the reason for denial.

While one or more preferred embodiments of the invention have been identified, other configurations and modifications can be provided within the scope of the present invention.

We claim:

1. A method for linking a plurality of established user accounts associated with at least one parent entity and a plurality of child entities, wherein a supplier of goods and services maintains the plurality of established user accounts and operates a website with which the plurality of established user accounts are associated; the method comprising:

receiving a structure that specifies respective relationships between the parent entity and the plurality of child entities;

selecting a parent account from among the plurality of established user accounts, wherein the parent account corresponds to the parent entity;

electronically linking each of the plurality of established user accounts to at least one other of the plurality of established user accounts or to the parent account by at least one relationship parameter in accordance with the structure, wherein each of the plurality of established user accounts has at least one user parameter;

electronically executing a first transaction request from a first user using at least one of the plurality of established user accounts in accordance with the relationship parameter and a first user parameter;

electronically executing at least one other transaction request by at least one other user using at least one of the plurality of established user accounts in accordance with the relationship parameter and a second user parameter;

electronically generating aggregate information indicative of the first transaction request and the at least one other transaction request; and electronically associating the aggregate information with the parent account.

2. A method as in claim 1 wherein the structure is a hierarchical tree.

3. A method as in claim 1 wherein the user parameter specified for a user is a total monetary amount of goods that can be purchased on that account without approval from the user of the parent account or of another one of the plurality of established user accounts.

4. A method as in claim 3 wherein the approval must be provided by the user of the account to which the one of the plurality of established user accounts that includes the user parameter is linked.

5. A method as in claim 1 wherein the user parameter specified for one of the plurality of established user accounts is maximum unit price of the good for which a user of that one of the plurality of established user accounts may place an order without approval from the user of the parent account or of another one of the plurality of established user accounts.

6. A method as in claim 5 wherein the approval must be provided by the user of the account to which the one of the plurality of established user accounts that includes the user parameter is linked.

7. A method as in claim 1 wherein the user parameter specified for a user account is a listing of items for which the user of that one of the plurality of established user accounts may place an order.

8. A method as in claim 1 wherein the relationship parameter for each of the plurality of established user accounts is uploaded to a computer system with which the website is associated in a file.

9. A method as in claim 8 wherein the file is a spreadsheet.

10. A method as in claim 1, wherein generating aggregate information includes generating a report of transactions that have occurred using the relationship parameter.

11. The method of claim 1, wherein associating the aggregate information with the parent account includes providing the aggregate information to a third user authorized to access the parent account; wherein neither the first user nor the second user is authorized to access the parent account.

12. A method for linking a plurality of established user accounts for the purchase of goods or services, wherein the plurality of established user accounts is associated with at least one parent entity and a plurality of child entities, and wherein a supplier of goods and services maintains a website with which the plurality of established user accounts are associated; the method comprising:
    selecting a parent account from the plurality of established user accounts on a computer system associated with a supplier of the goods and the services;
    providing access to the parent account to an authorized user;
    electronically linking each of the plurality of established user accounts to at least one other of the plurality of established user accounts or to the parent account by at least one relationship parameter and each of the plurality of established user accounts having at least one user parameter, wherein the relationship parameter is a parameter requiring approval for selected transactions and the user parameter is selected from the group of specifying a listing of items for which a user of that one of the plurality of established user accounts may place an order, a maximum unit price of the good for which the user of that user account may place, and a total monetary amount of goods that can be purchased on that account;
    electronically executing a transaction request from the user using at least one of the plurality of established user accounts in accordance with the relationship parameter and the user parameter; and
    providing information indicative of the transaction request to the authorized user.

13. A method as in claim 12 further comprising: generating a report of transactions that have occurred using the relationship parameter.

14. A computer system operated by a supplier of goods and services, the computer system comprising:
    a computer-readable memory to store data, the data including:
        a first data corresponding to an established parent account associated with a parent entity;
        a second data corresponding to a plurality of established user accounts associated with a respective plurality of child entities, each of said plurality of established user accounts having at least one user parameter; wherein the established parent account and the plurality of established user accounts are accounts for the purchase of goods or services;
    a website server to receive a structure that specifies respective relationships between the parent entity and the plurality of child entities to define a respective relationship parameter of each of the plurality of established user accounts; wherein the supplier of goods and services links each of the plurality of established user accounts to at least one other of the plurality of established user accounts or to the established parent account by the relationship parameter in accordance with the structure; and
    a computer-readable medium to store program instructions that execute on a processor of the computer system to process a plurality of transaction requests from a plurality of users, the program instructions including:
        a transaction executor stored as a first set of instructions to process the plurality of transaction requests using at least one of the established user accounts in accordance with the relationship parameter and the respective user parameter; wherein at least some of the plurality of transaction requests are associated with purchase orders, and wherein the transaction executor completes the purchase orders at the computer system; and
        a data aggregator stored as a second set of instructions to associate the plurality of transaction requests with the established parent account.

15. A computer system as in claim 14 wherein the structure defines a hierarchical tree.

16. A computer system as in claim 14 wherein the user parameter specified for a user is a total monetary amount of goods that can be purchased on that account without approval from the user of the parent account or of another user account.

17. A computer system as in claim 16 wherein the approval must be provided by the user of the account to which the user account that includes the user parameter is linked.

18. A computer system as in claim 14 wherein the user parameter specified for a user account is maximum unit price of the good for which a user of that user account may place an order without approval from the user of the parent account or of another user account.

19. A computer system as in claim 18 wherein the approval must be provided by the user of the account to which the user account that includes the user parameter is linked.

20. A computer system as in claim 14 wherein the user parameter specified for a user account is a listing of items for which the user of that user account may place an order.

21. A computer system as in claim 14 wherein the website server receives the structure in a file.

22. A computer system as in claim 21 wherein the file is a spreadsheet.

23. A computer system as in claim 14, wherein the data aggregator includes a report generator to generate a report of transactions that have occurred using the relationship parameter.

24. A computer system operated by a single commercial entity the computer system comprising:
- a computer-readable memory to store data, the data including:
  - a first data corresponding to an established parent account associated with a parent entity for the purchase of goods or services from the commercial entity associated with an authorized user;
  - a second data corresponding to a plurality of established user accounts associated with a respective plurality of child entities for the purchase of goods or services from the commercial entity, each of said established user accounts being linked to at least one other established user account or to the established parent account by at least one relationship parameter and each user account having at least one user parameter, wherein the relationship parameter is a parameter requiring approval for selected transactions and the user parameter is selected from the group of specifying a listing of items for which the user of that user account may place an order, a maximum unit price of the good for which a user of that user account may place, and a total monetary amount of goods that can be purchased on that account;
- a computer-readable medium to store program instructions that execute on a processor of the computer system to link the plurality of established user accounts and process a plurality of transaction requests from at least one user, the program instructions including:
  - a structure receiver stored as a first set of instructions to receive a structure that specifies respective relationships between the parent entity and plurality of child entities to populate the respective relationship parameters for each of the plurality of established user accounts; wherein the single commercial entity links each of the plurality of established user accounts to at least one of the plurality of established user accounts to the established parent account in accordance with the received structure;
  - a transaction executor stored as a second set of instructions to execute the plurality of transaction requests from the at least one user using at least one of the established user accounts in accordance with the relationship parameter and the user parameter; and
  - a report generator stored as a third set of instructions and configured to generate a report indicative of the plurality of transaction requests in response to receiving a report request from the authorized user.

* * * * *